United States Patent [19]

Arikawa

[11] Patent Number: 4,854,649
[45] Date of Patent: Aug. 8, 1989

[54] ANTI-SKID CONTROL APPARATUS FOR A VEHICLE BRAKING SYSTEM

[75] Inventor: Tetsuro Arikawa, Kanagawa, Japan

[73] Assignee: Nippon A B S, Ltd., Japan

[21] Appl. No.: 143,650

[22] Filed: Jan. 13, 1988

[30] Foreign Application Priority Data

Jan. 14, 1987 [JP] Japan .................................. 62-007721
Jan. 16, 1987 [JP] Japan .................................. 62-008692

[51] Int. Cl.$^4$ .......................... B60T 8/34; B60T 8/64; B60T 8/88
[52] U.S. Cl. .................................. 303/113; 303/111; 303/92
[58] Field of Search ................. 188/181 R, 181 A; 303/84.2, 111, 92, 113, 114, 115, 116, 117, 119

[56] References Cited

U.S. PATENT DOCUMENTS

| | | | |
|---|---|---|---|
| 3,532,391 | 10/1970 | Klein | 303/119 |
| 3,674,317 | 7/1972 | Mangold | 303/111 |
| 3,756,666 | 9/1973 | Leiber | . |
| 3,866,983 | 2/1975 | Kondo | 303/119 |
| 3,871,713 | 3/1975 | Lister | 303/113 |
| 3,874,745 | 4/1975 | Peruglia et al. | 303/115 |
| 3,980,346 | 9/1976 | Leiber | 303/115 |
| 4,033,638 | 7/1977 | Bertone et al. | 303/116 |
| 4,229,049 | 10/1930 | Ando | 303/115 |
| 4,602,824 | 7/1986 | Nishimura et al. | 303/92 X |

FOREIGN PATENT DOCUMENTS

| | | | |
|---|---|---|---|
| 2411173 | 9/1974 | Fed. Rep. of Germany | 303/92 |
| 2449481 | 4/1976 | Fed. Rep. of Germany | 303/115 |
| 0211154 | 9/1986 | Japan | 303/116 |
| 2182405 | 5/1987 | United Kingdom | . |

Primary Examiner—Andres Kashnikow
Assistant Examiner—Timothy Newholm
Attorney, Agent, or Firm—Jones, Day, Reavis & Pogue

[57] ABSTRACT

An anti-skid control apparatus includes a master cylinder, a fluid pressure control valve for controlling fluid pressures of wheel cylinders connected to one of two brake conduit circuits, and a valve apparatus for controlling fluid pressure of wheel cylinders connected to the other of the two brake conduit circuits. The valve apparatus includes a casing having first and second input ports, an output port, a piston, a control chamber and a volume chamber formed at both sides of the piston. A valve part is disposed between the first input port and the volume chamber, the first input port being connected to one fluid pressure generating chamber of the master cylinder and the output port being connected to the wheel cylinders that are connected to the other of the two brake conduit circuits. A changeover valve is connected to the second input port. The changeover valve is set either in a first position for connecting another fluid pressure generating chamber of the master cylinder to the control chamber or else a second position for connecting the output side of the fluid pressure control valve with the control chamber. When the changeover valve is in the first position, the valve part is open, and when the changeover valve is in the second position and the fluid pressure control valve is operated, the piston is moved toward the control chamber to close the valve part so as to cut off the first input port from the volume chamber and change the volume of the volume chamber.

10 Claims, 7 Drawing Sheets

ANTI-SKID CONTROL APPARATUS FOR A VEHICLE BRAKING SYSTEM

BACKGROUND OF THE INVENTION

1. Field of the Invention

This invention relates to an anti-skid control apparatus for a vehicle braking system which can prevent locking of the wheels.

2. Description of the Prior Art

An anti-skid control apparatus for a vehicle braking system is known that includes a fluid pressure control valve device arranged between a master cylinder and a wheel cylinder of a brake for the wheel, the fluid pressure control valve device receiving control signals from a control unit that measures how close the wheel is to skidding so as to control brake fluid pressure to the wheel cylinder.

When a fluid pressure control valve is provided for each of four wheels, with independent control of the fluid pressure, control is no problem. When a fluid pressure control valve device is provided for each of two front wheels and for both rear wheels in common, control is no problem. In the latter case, the one common fluid pressure control valve device is controlled on the basis of the lower of the speeds of the rear wheels.

However, the above case require three or four fluid pressure control valve devices. Accordingly, the whole anti-skid control apparatus is large, very heavy and expensive.

Accordingly, to provide a relatively small and economical anti-skid control apparatus for a vehicle braking system that can minimize the chance of locking of rear wheels, this applicant previously proposed an anti-skid control apparatus for a vehicle braking system that included fluid pressure generating means to which two brake conduit circuits were connected, a fluid pressure control valve for controlling fluid pressures of wheel cylinders of wheels connected to one of the two brake conduit circuits, and a valve apparatus for controlling fluid pressures of wheel cylinders of wheels connected to the other of the two brake conduit circuits. The valve apparatus comprised a casing having first and second input ports, an output port, a piston, a control chamber and a volume chamber formed at both sides of the piston. A valve was arraned between the first input port and the volume chamber, the first input port being connected to one fluid pressure generating chamber of the fluid pressure generating means, and the output port being connected to the wheel cylinders connected to the other of the two brake conduit circuits. When the fluid pressure control valve was operated, the piston was moved towards the control chamber to close the valve cutting off the first input port from the volume chamber and changing the volume of the volume chamber with the movement of the piston to change the fluid pressure of the wheel cylinders connected to the other of the two brake conduit circuits.

However, in the apparatus described above, since the braking forces on all of the wheels connected to the two brake conduit circuits were controlled by the one fluid pressure control valve, the braking forces on the wheels which were not locked or had not yet tended to lock were decreased along with those of the wheels which are locked or tend to lock. Accordingly, the braking forces were reduced unnecessarily for the wheels which were not locked. The braking distance of the vehicle was lengthened.

Further, when the one fluid pressure control valve was mechanically locked or held at a brake relieving position or brake holding position, there is the danger that no braking force was imparted to any of the wheels, or that the braking force became dangerously low.

SUMMARY OF THE INVENTION

Accordingly, it is an object of this invention to provide an anti-skid control apparatus for a vehicle braking system which can prevent unnecessary reduction of the braking force on the wheel and can shorten the braking distance of the vehicle.

Another object of this invention is to provide an anti-skid control apparatus for a vehicle braking system which an impart braking force to at least the wheels connected to one of the two brake conduit circuits even when the one fluid pressure control valve is mechanically locked or held at a brake relieving position or a brake holding position.

In accordance with an aspect of this invention, an anti-skid control apparatus for vehicle braking system comprises fluid pressure generating means to which two brake conduit circuits are connected. A fluid pressure control valve for controlling fluid pressures of wheel cylinders of wheels is connected to one of the two brake conduit circuits and a valve apparatus for controlling fluid pressures of wheel cylinders of wheels is connected to the other of said two brake conduit circuits. The valve apparatus comprises a casing having first and second input ports, an output port, a piston or piston members, a control chamber and a volume chamber formed at both sides of the piston or piston members, and a valve part arranged between the first input port and said volume chamber. The first input port is connected to one fluid pressure generating chamber of said fluid pressure generating source, the output port is connected to the said wheel cylinders that are connected to the other of said two brake conduit circuits. A changeover valve is connected to the second input port of the casing of the valve apparatus. It takes a first position to connect another fluid pressure generating chamber of the fluid pressure generating source to the control chamber of the valve apparatus and a second position to connect the output side of the fluid pressure control valve to the control chamber of the valve apparatus. When the changeover valve takes the first position, the valve part is open, and when the changeover valve takes the second position and the fluid pressure control valve is operated, the piston or piston members are moved toward the control chamber to close the valve to cut off the first input port from the volume chamber and change the volume of the volume chamber with the movement of the piston or piston member changing the fluid pressure of the wheel cylinders connected to the other of the two brake conduit circuits.

The foregoing and other objects, features, and advantages of the present invention will be more readily understood upon consideration of the following detailed description of the preferred embodiments of the invention, taken in conjunction with the accompanying drawings.

DESCRIPTION OF THE PREFERRED EMBODIMENTS

Figure 1:
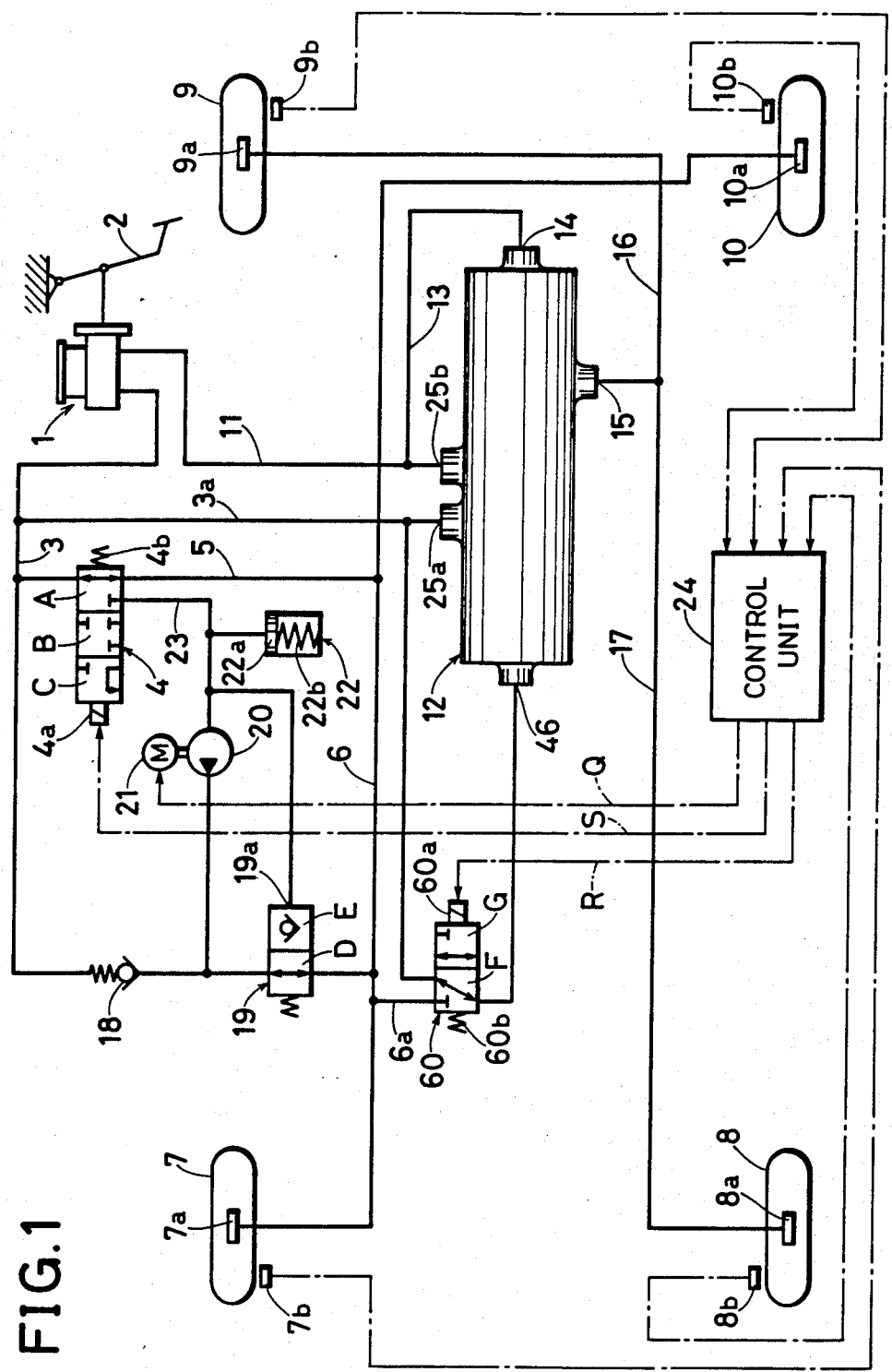
FIG. 1 is a schematic view of an anti-skid control apparatus according to a first embodiment of this invention.

In FIG. 1, a brake pedal 2 is connected to a tandem master cylinder 1. One fluid pressure chamber of the tandem master cylinder 1 is connected to a wheel cylinder 7a of a right front wheel 7 through a conduit 3 and an electromagnetic three-position valve 4 and conduits 5 and 6. The valve 4 functions as a fluid-pressure control valve. The conduit 3 is further connected through a check valve 18 and a controllable check valve 19 to the wheel cylinder 7a. A discharge opening or outlet opening of a fluid pressure pump 20 is connected to the connection point between the check valve 18 and the controllable check valve 19. Although the fluid pressure pump 20 is shown schematically, its construction is well known, and includes check valves (not shown) at the inlet and outlet sides. The check valves permit fluid to flow only to the left in FIG. 1. The fluid pump 20 is driven by an electric motor 21. A discharge opening of the valve 4 is connected through a conduit 23 to a hydraulic reservoir 22. The hydraulic reservoir 22 includes a piston 22a slidably fitted to a casing and a relatively weak spring 22b. A reserve chamber of the reservoir 22 is connected to a suction opening of the fluid pressure pump 20, and is also connected to a control port 19a of the controllable check valve 19.

The conduit 6 is also connected to a wheel cylinder 10a of a left rear wheel 10 and to one inlet port of a changeover valve 60 through a conduit 6a. Thus, the wheel cylinders 7a and 10a of the wheels 7 and 10 are controlled in common by the valve 4. A conduit 3a connects the conduit 3 to a connecting port 25a of a valve apparatus 12 which will be described below in detail. The conduit 3a is also connected to another inlet port of the valve 60. The second fluid pressure chamber of the tandem master cylinder 1 is connected to a connecting port 25b of the valve apparatus 12 through a conduit 11. A conduit 13 connects the conduit 11 through an input port 14 of the valve apparatus 12, an output port 15 thereof, and a conduit 16 to a wheel cylinder 9a ;L of a right rear wheel 9.

The conduit 16 is further connected through a conduit 17 to a wheel cylinder 8a of a left front wheel 8. Thus, the wheel cylinders 8a and 9a of the left front wheel 8 and right rear wheel 9 are controlled in common by the valve apparatus 12.

Wheel speed sensors 7b, 8b, 9b and 10b are associated with the wheels 7, 8, 9 and 10 respectively, and they generate pulse signals having frequencies proportional to the rotational speed of the wheels 7, 8, 9 and 10. The pulse signals of the wheel speed sensors are supplied to a control unit 24. The control unit 24 has a well-known design. It takes the outputs of the wheel speed sensors 7b, 8b, 9b, and 10b, and determined the skid condition or rotational condition of the wheels, wheel speeds of the wheels, approximate vehicle speed, slip ratio, and accelerations or decelerations. A control signal S is generated in the control unit 24 and is supplied to a solenoid portion 4a of the valve 4. Dashed lines represent electric lead wires.

The electromagnetic valve 4 has a well-known construction and is therefore shown schematically. When the control signal S is "0", the valve 4 takes a first position A to increase the brake pressure at the wheel. In the first position A, the master cylinder side and the wheel cylinder side 7a and 10a are connected. When the control signal S is "½", the valve 4 takes a second position B to keep the brake pressure to the brake constant. In the second position B, the connection between the master cylinder side and the wheel cylinder side, and that between the wheel cylinder side and the reservoir side are broken. When the control signal S is "1", the valve 4 takes a third position C to decrease the brake pressure. In the third position C, communication between the master cylinder side and the wheel cylinder side is interrupted, while the wheel cylinder side and the reservoir side are connected. The brake fluid is discharged through the conduit 23 into the reservoir 22 from the wheel cylinders 7a and 10a. The valve 4 may be responsive to current or voltage control.

The control unit 24 further generates a drive signal Q during the skid control operation. The drive signal Q is supplied to the motor 21.

The controllable check valve 19 normally takes a position D as shown, and connects both sides. When the fluid pressure of the control port 19a, and therefore that of the fluid pressure pump 20, becomes higher than a predetermined value, the valve 19 switches to a position E, where it functions as a check valve which permits fluid to flow only in the direction extending from the wheel cylinder (7a) side toward the master cylinder side.

Figure 2:
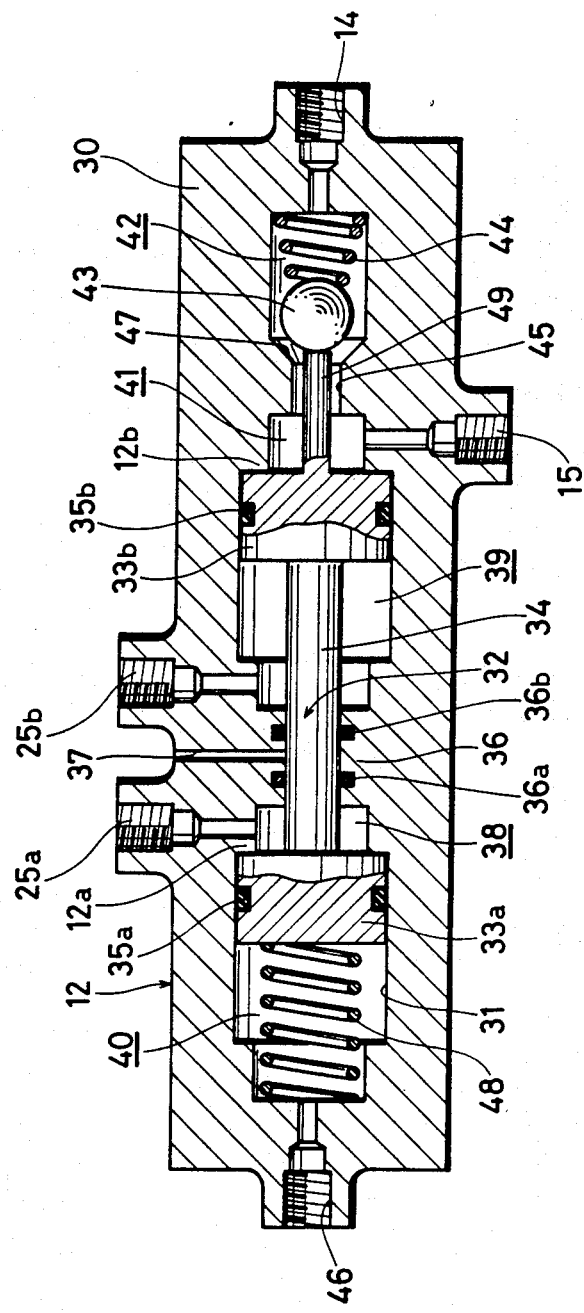
FIG. 2 is an enlarged cross-sectional view of a valve apparatus in FIG. 1.

FIG. 2 is a sectional view of valve 12. In FIG. 2, a stepped through-hole 31 is axially formed in a casing 30 of the valve apparatus 12. A piston 32 is slidably fitted into the stepped through-hole 31, consisting of a pair of larger-diameter portions 33a and 33b, a smaller-diameter portion 34 formed between the larger-diameter portions 33a and 33b, and a rod portion 49 formed from the one larger-diameter portion 33b. The larger-diameter portions 33a and 33b are provided with seal rings 35a and 35b. A control chamber 40 and a master cylinder pressure chamber 38 are formed at both sides of the other larger-diameter portion 33a. An output chamber 41 as a volume chamber and another master cylinder pressure chamber 39 are formed at both sides of the one larger-diameter portion 33b. The master cylinder pressure chambers 38 and 39 communicate with the fluid pressure generating chambers of the master cylinder 1 through connecting holes 25a nd 25b. When both of the two conduit systems are in order, the fluid pressures of the master cylinder pressure chambers 38 and 39 are equal, and the forces acting on the piston 32 cancel. The smaller-diameter portion 34 is slidably fitted to a central hole made in a partition 36 of the casing 30, sealed with seal rings 36a and 36b. A space between the seal rings 36a and 36b is connected to the atmosphere through a vent 37.

The piston 32 is urged to the right by a spring 48 that is compressed in the control chamber 40. The original position of the piston 32 is determined by the contact of its larger-diameter portion 33a or 33b with a stepped portion 12a or 12b of the inner wall of the casing 30. The control chamber 40 is connected through the control port 46 and the changeover valve 60 to the wheel cylinders 7a, 10a or the master cylinder 1 of FIG. 1. The output port of the changeover valve 60 is connected to the control port 46 and to one input port in response to the solenoid portion 60a of FIG. 1. When the solenoid portion 60a is not energized, the valve 60 takes a position F by spring force of a spring portion 60b. When the solenoid portion 60a is energized, the valve 60 takes another position G against spring force of the spring portion 60b.

Figure 3:
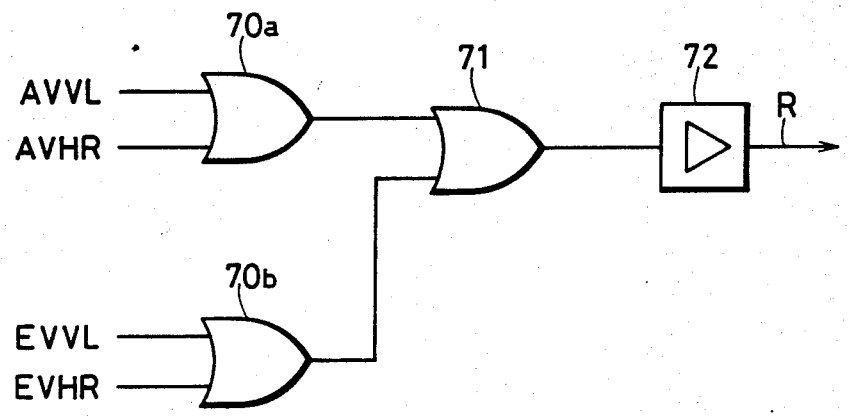
FIG. 3 is a block diagram of an important part of the control unit in FIG. 1.

The solenoid portion 60a of the valve 60 of FIG. 1 is energized by a drive signal R from the control unit 24. The control unit 24 is well known. It may be a circuit as shown in FIG. 3 to generate the signal R.

The control unit 24 of FIG. 1 determines skid conditions of the wheels 7, 8, 9 and 10. On the basis of the results, the control unit 24 generates brake relieving signals AVVR, AVVL, AVHR, AVHL and brake holding signals EVVR, EVVL, EVHR, EVHL. On the basis of these signals, the control unit 24 generates the above-described control signal S. The brake relieving signals AVVL, AVHR and brake holding signals EVVL, EVHR of these signals for the wheels 8 and 9 are supplied to OR gates 70a, and 70b respectively in FIG. 3. The first two letters AV and EV mean "brake relieving signal" and "brake holding signal", respectively, the third letters V and H mean "front wheel" and "rear wheel" respectively and the fourth letters R and L mean "right" and "left" respectively.

Output terminals of the OR gates 70a, and 70b are connected to an OR gate 71. An output of the OR gate 71 is amplified by an amplifier 72. The drive signal R is obtained from the amplifier 72. This signal R is supplied to the solenoid portion 60a of the changeover valve 60.

Referring again to FIG. 2, the rod portion 49 of the piston 32 extends normally through the output chamber 41 and a smaller-diameter portion 45 of the stepped hole 31 into the input chamber 42 in which the top end of the rod portion 49 contacts a valve ball 43 that is faced to the left by a spring 44, and separates the valve ball 43 from valve seat 47. The input chamber 42 is always connected to one fluid pressure generating chamber of the tandem master cylinder through the input port 14 and the conduits 13 and 11. The output chamber 41 is always connected to the output port 15 and the conduits 17 or 16 with the wheel cylinders 8a and 9a.

In the first embodiment of this invention, suppose the vehicle runs at a substantially speed, and that the brake pedal 2 is depressed rapidly. Pressurized fluid is supplied from the master cylinder 1 to the wheel cylinders 7a and 10a of the wheels 7 and 10 through the conduit 3, the valve 4a and the conduits 5 and 6. Further, the pressurized fluid is supplied to the wheel cylinders 8a and 9a of wheels 8 and 9 through the conduits 11 and 13, the input port 14, the output port 15 in the valve apparatus 12, and the conduits 16 and 17. Thus, the wheels 7, 8, 9 and 11 are braked.

The fluid pressures of the fluid pressure generating chambers of the master cylinder 1 rise at substantially the same rate. Accordingly, the pressures of the master cylinder pressure chambers 38 and 39 are substantially equal to each other in the valve apparatus 12. Further, the pressures of the output chamber 42 and control chamber 40, when the valve ball 43 is separated from the valve seat 47, are substantially equal to each other. Accordingly, the piston 32 is not moved, and remains at the neutral position.

As described above, all of the wheels 7 to 10 are braked. Suppose now that all of the wheels 7 to 10 are put into skid conditions. For example, suppose the slips of the wheels 7 to 10 become higher than the predetermined slip value. The control signals reach the level "1" and motor drive signal Q becomes "1". The valve 4 is changed over into the position C and fluid pressure pump 20 is driven by the motor 21.

All the wheels 7 to 10 generate brake relieving signals. The brake relieving signals AVVL and AVHR of the wheels 8 and 9 are supplied to the OR gate 70a in FIG. 3. Accordingly, the output of the OR gate 71 becomes "1" and so the valve drive signal R is generated. This signal R is supplied to the solenoid portion 60a of the changeover valve 60, and the valve 60 is changed over to the position G. Thus, the control chamber 40 of the valve apparatus 12 is connected to the wheel cylinders 7a and 10a of the wheels 7 and 10 in the other conduit system.

The master cylinder 1 side and the wheel cylinder 7a and 10a side are disconnected from each other, while the wheel cylinder 9a and 10a side and the reservoir 22 side are connected. Pressurized fluid is discharged from the wheel cylinders 7a and 10a into the reservoir 22 through the conduits 6, 5 and 23, and is drawn into the fluid pressure pump 20 and fed to the controllable check valve 19. Since the controllable check valve 19 is set at the position D, the brake fluid discharged from the fluid pressure pump 19 flows to the conduit 6, then into the reservoir 22 through the conduits 5 and 23.

Thus, the brake fluid circulates through the fluid pressure pump 20 through the controllable check valve 19, the conduits 6, 5 and 23, the reservoir 22 and the fluid pressure pump 20. The check valve 18 has its own valve-opening pressure and the fluid pressure of the master cylinder 1 has increased, so the fluid discharged from the fluid pressure pump 20 does not flow to the master cylinder 1 side. Instead, it circulates through the flow path exhibiting no resistance except the resistance of the conduits. In other words, the discharge pressure of the fluid pressure pump 20 does not act on the master cylinder 1. Accordingly neither kick-back action nor pedal reaction is imparted to the brake pedal 2, and there is good pedal feeling.

The decreased fluid pressure of the wheel cylinders 7a and 10a is applied to the control chamber 40 of the valve apparatus 12 through the changeover valve 60 and the control port 46.

As a result, the fluid pressure of the control chamber 40 also decreases. On the other hand, the fluid pressure of the output chamber 41 increases in the valve apparatus, moving the piston 32 to the left. Thus, the valve ball 43 comes into contact with the valve seat 47, so that the input chamber 42 and the output chamber 41 are disconnected. Since the fluid pressure of the chamber 40 continues to decreases, the piston 32 is moved more to the left. The volume of the output chamber 41 increases. The fluid pressure of the wheel cylinders 8a and 9a as received from the output chamber 41 through the output port 15 and the conduits 16 and 17 decreases with the increase of the volume of the output chamber 41.

The fluid pressure of the wheel cylinders 8a and 9a in the one conduit system is decreased in accordance with that of the wheel cylinders 7a and 10a in the other conduit system, and the braking forces are decreased at all of wheels 7 to 10.

When the control unit 24 determines that the slips of all of the wheels 7 to 10 are lower than the predetermined value, the control signal S cycles between "$\frac{1}{2}$" and Thus, the valve 4 is switched between positions B and C.

In the position C, the braking force of the wheel is decreased as described above. In the position B, the master cylinder 1 side is disconnected from the wheel cylinder (7a) and (10a) side, and the wheel cylinder (7a) and (10a) side is disconnected from the reservoir (22) side. Accordingly, the pressurized fluid from the fluid pressure pump 20 is supplied through the controllable check valve 19 to the wheel cylinders 7a and 10a and without circulation. The fluid pressure of the wheel cylinders 7a and 10a rises. However, the valve 4 is at once changed over into the position C. The fluid pressure of the wheel cylinders 7a and 10a is decreased. Next, the valve 4 is changed over into the position B to raise the fluid pressure of the wheel cylinders 7a and 10a. When the period of the cycle between the positions B and C is considerably short, the fluid pressure of the wheel cylinders 7a and 10a can be made substantially constant. Thus, the braking force of all of the wheels 7 to 10 can be made substantially constant.

When the wheel speeds of all of the wheels 7 to 10 become sufficiently high, and thus the accelerations of the wheels 7 to 10 become higher than the predetermined value, the acceleration signal causes the control unit 24 to change the control signal S to the level "$\frac{1}{2}$" and keep it there. The valve 4 switches to position B. The pressurized fluid from the fluid pressure pump 20 is supplied through the controllable check valve 19 to the wheel cylinders 7a and 10a and the fluid pressure to the wheel cylinders 7a and 10a increased. When the rotational speed of the motor 21 is suitably selected, the fluid pressure of the wheel cylinders 7a and 10a can be increased more slowly than in the case when the pressurized fluid is supplied directly from the master cylinder 1 in the position A of the valve 4.

When the acceleration signal disappears, the control signal S from the control unit 24 again becomes "1". Thus, the braking forces at the wheels 7 to 10 are decreased.

The above-described operations are repeated during the anti-skid control operation. Suppose the frictional coefficient of the road has been relatively high and then becomes low while the brake is being released. At that time, the fluid pressure of the wheel cylinders 7a to 10a is decreased and much pressurized fluid is discharged into the reservoir 22. The piston 22a is moved much in the reservoir 22 and the spring 22b is compressed. The fluid pressure of the reservoir chamber is increased in the reservoir 22, and it becomes higher than the predetermined value. As a result, the controllable check valve 19 is changed over into the position E. Accordingly, the pressurized fluid from the fluid pressure pump 20, drawing from the reservoir 22, opens the check valve 18 and is returned to the master cylinder without circulation. Of course, before the fluid pressure of the reservoir chamber of the reservoir 22 becomes higher than the predetermined value, the pressurized fluid from the pressure fluid pump 20 circulates in the above described manner, since the controllable check valve 19 is put at the position D.

While the vehicle is running on the road having a relatively high coefficient of friction (a so-called high-$\mu$ road), no kickback is imparted to the brake pedal when it is depressed. However, when the frictional coefficient of the road becomes relatively low (L-$\mu$ road, for example, an icy road), some kickback is imparted to the brake pedal 2. This causes the so-called H-L jumping phenomenon. However, since the H-L jumping phenomenon seldom occurs, there is practically little problem.

When the brake pedal 2 is released during the anti-skid control operation or during change-over of the valve 4 into position B or C, the pressurized fluid is returned from the wheel cylinders 7a and 10a into the master cylinder 1 through the controllable check valve 19 and the check valve 18.

In the above case, all the wheels 7 to 10 are equally braked and are equally likely to skid. Now, suppose that the wheels 7 and 10 of the one-conduit system are put into a skid condition while the wheels 8 and 9 of the other conduit system are not yet put into such a skid condition.

In this case, the control signal S becomes "1" or "$\frac{1}{2}$" and the valve 4 as a fluid pressure control valve is changed into the position B or C as above described. However, the changeover valve 60 is not changed, and so it is maintained at the position F. Thus, all of the input signals AVVL, AVHR, EVVL, EVHR to the OR gates 70a, 70b are "0", and so the drive signal R is "0". Accordingly, the solenoid portion 60a of the changeover valve 60 is not energized, but is maintained at the position F. The control chamber 40 of the valve apparatus 12 is connected to the master cylinder (1) side. Thus, fluid pressures of the wheel cylinders 7a and 10a of the wheels 7 and 10 in the one conduit system are decreased or held constant, while the fluid pressures of the wheel cylinders 8a and 9a of the wheels 8 and 9 in the other conduit system continue to rise.

Generally, the brake relieving signal or the brake holding signal are not generated at the same time in all of the wheels. For example, this embodiment is particularly effective for the following case. Suppose that the road is a "split" road, and that the right side the side of wheels 7 and 9 of the vehicle is a low-$\mu$ side, while the left side is a high-$\mu$ side. Further, suppose that the front wheels are braked more strongly than the rear wheels. At first, the brake relieving signal or brake holding signal of the right front wheel 7 is generated. Accordingly, as above described, only the braking of the wheels of the one conduit system is relieved or held constant. The braking force in the other conduit system the side of wheels 8 and 9 continues to rise. Thus, the braking distance can be reduced from that shown in the prior art. In the prior art, when the brake relieving signal or the brake holding signal is generated in at least one wheel, the braking of all the wheels are relieved or held at a reduced constant value. The brake distance is thus longer than that of this embodiment.

The effect of a split road has been described above. However, on a road having a uniform frictional coefficient, the brake relieving signals or the brake holding signals are usually not generated from all the wheels at the same time. Accordingly, in any case, this embodiment can shorten the braking distance over that shown in the prior art.

Next, suppose that the conduit 3 side, for example, of the two conduit systems fails. In that case, the fluid pressures of the one master cylinder pressure chamber 38 and control chamber 40 are zero, while those of the other master cylinder pressure chamber 39 and output chamber 41 rise. Accordingly, the piston 32 is maintained at the position shown. When the failure occurs during the anti-skid control operation, the piston 32 is moved to the right, and takes the position shown. Accordingly, the valve ball 43 remains separated from the valve seat 47. The one fluid pressure generating chamber of the master cylinder 1 is connected to the wheel cylinders 8a and 9a through the valve apparatus 12 and the right conduit system is effective in braking.

When the conduit 11 side fails, the fluid pressure of the wheel cylinders 7a and 10a can rise irrespective of the valve apparatus 12. Thus, the braking forces can be securely obtained without any problem.

Figure 4:
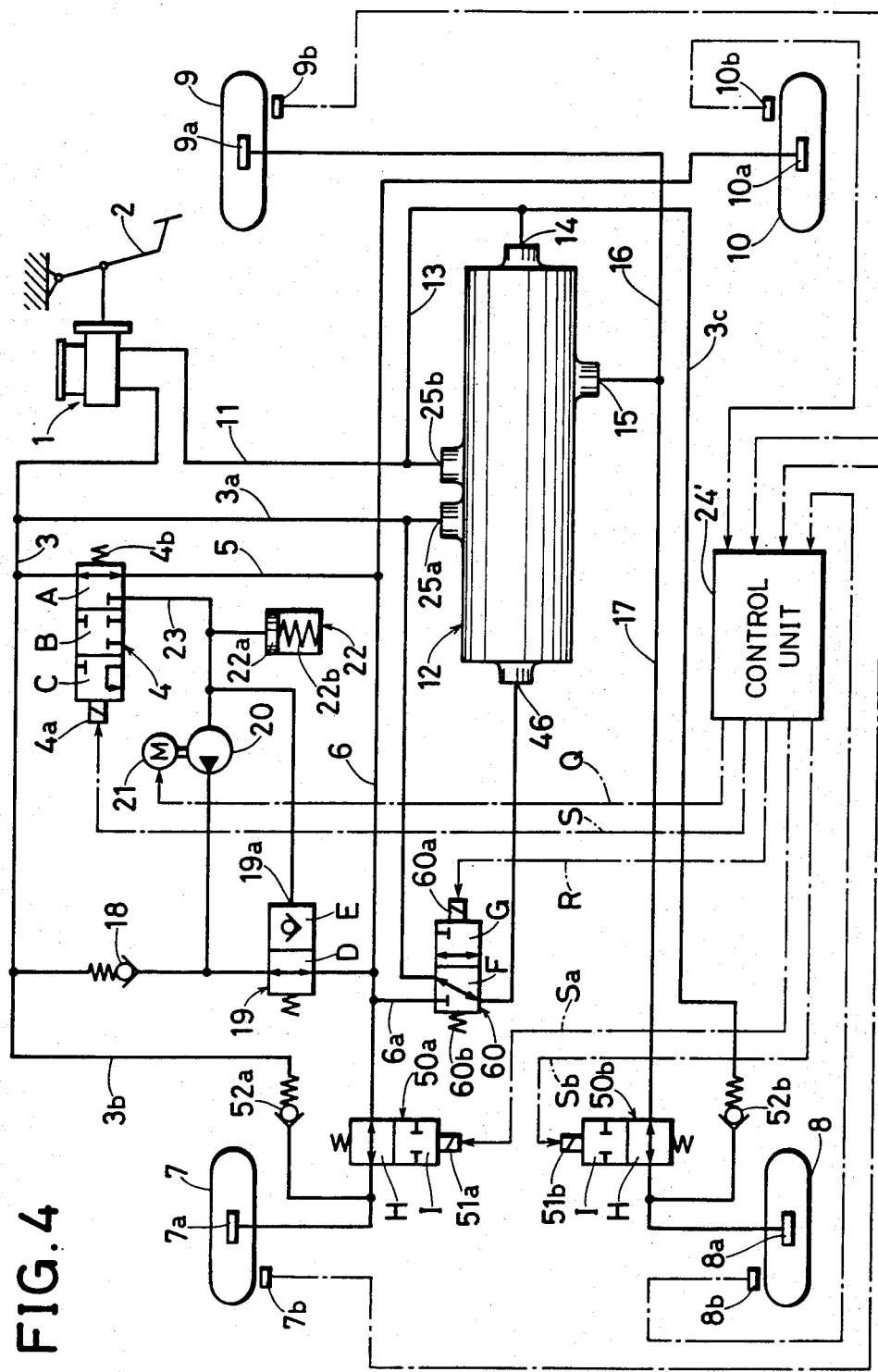
FIG. 4 is a schematic view of an anti-skid control apparatus according to a second embodiment of this invention.

Next, consider a second embodiment of this invention with reference to FIG. 4. Parts in FIG. 4 which correspond to those in FIG. 1 are denoted by the same reference numerals, the description of which will be omitted.

Cutoff valves 50a and 50b are arranged between the conduits 6 and 17 and wheel cylinders 7a and 8a. The master cylinder 1 is connected to the wheel cylinders 7a and 8a through conduits 3b and 3c. Check valves 52a and 52b are arranged in the conduits 3b and 3c to permit brake fluid to flow only in the directions extending from the wheel cylinders 7a and 8a toward the master cylinder 1 side. A control unit 24 generates control signals Sa and Sb. The control signals Sa and Sb are supplied to solenoid portions 51a and 51b of the valves 50a and 50b, respectively. When the control signals Sa and Sb are "0", the cutoff valves 50a and 50b take positions H in which the conduits at both sides of the valves are connected. When the control signals Sa and Sb are "1", the cut-off valves 50a and 50b take positions I in which the conduits at both sides of the valves are disconnected.

In the first embodiment, the braking forces at the wheels 7 and 10 and those at the wheels 8 and 9 are increased, decreased or held constant at the same time. However, in the second embodiment, the braking forces the front wheels 7 and 8 can be held independently of the braking forces on the rear wheels 9 and 10. In the alternative, only one of the front wheels 7 and 8 can be held constant.

When the front wheels 7 and 8 are provided with spiked tires and the rear wheels 9 and 10 are provided with normal tires, the rear wheels 9 and 10 are more apt to lock. Accordingly, the braking forces on the rear wheels 9 and 10 are decreased, while the braking forces on the front wheels 7 and 8 are held constant. At this time, the control signals S, Sa, and Sb are "1", respectively.

When the frictional coefficients of the road are considerably different at both sides, the braking force of the front wheel on the road side of the lower frictional coefficient is decreased, while the braking force of the front wheel on the road side of the higher frictional coefficient is held constant.

The other operations and advantages of this embodiment are the same as those of the first embodiment. Further, when the brake pedal 2 is released when Sa=1 and Sb=1, the pressurized fluid can return through the check valves 52a and 52b and the conduits 3b and 3c to the master cylinder 1. The pressurized fluid from the other wheel cylinders 9a and 10a can return to the master cylinder 1 in the same manner as in the first embodiment.

Next, there will be described an apparatus according to a third embodiment of this invention with reference to FIG. 5. Parts in FIG. 5 which correspond to those in FIG. 4 are denoted by the same reference numerals, the description of which will be omitted.

In comparison with the second embodiment, a two-position electromagnetic changeover valve 80 is arranged instead of the three-position electromagnetic changeover valve 4.

In the above embodiments, during anti-skid control, the brake fluid is circulated from the fluid pressure pump 20 to the controllable check valve 19, to the conduits 6, 5, 23 to the reservoir 22, and back to the fluid pressure pump 20. In the embodiment of FIG. 5, the outlet of the fluid pressure pump 20 is connected directly to the conduit 3 without the described above circulation.

The two-position electromagnetic changeover valve 80 is normally held in a position J by the spring force of a spring 80b. The valve 80 connects the conduit 3 to the conduit 5. When a solenoid portion 80a is energized, the valve 80 takes another position K, interrupting the connection of the conduit 3 and the conduit 5, while the conduit 5 side is connected through the reservoir 22 through the conduit 23. The control signal S which is supplied to the solenoid portion 80a is "0" or "1".

Other operations and effects are similar to those of the first and second embodiments. In this embodiment, the discharge pressure of the fluid pressure pump 20 is applied to the master cylinder 1, which produces kickback of the pedal 2.

Figure 6:
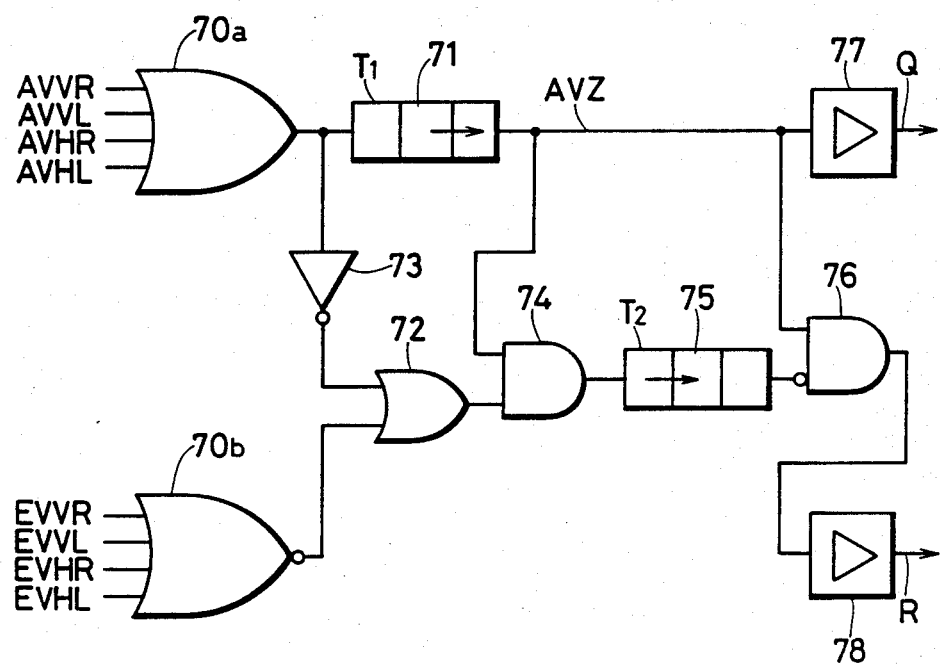
FIG. 6 is a circuit diagram of an important part of a control unit in an anti-skid control apparatus according to a fourth embodiment of this invention.

FIG. 6 is a circuit diagram of an important part of a control unit in an anti-skid control apparatus according to a fourth embodiment of this invention. The conduit system is the same as the conduit system shown in FIG. 1 of the first embodiment.

The brake relieving signals AVVR, AVVL, AVHR, AVHL are supplied to an OR gate 70a, and the brake holding signals EVVR, EVVL, EVHR, EVHL are supplied to a NOR gate 70b. An output terminal of the OR gate 70a is connected to an OFF-delay timer 71. The output of the timer 71 is amplified by an amplifier 77 and becomes the motor drive signal Q. The OFF-delay time $T_1$ of the OFF-delay timer 71 is of the order of one second. The output of timer 71 is always "1" during the anti-skid control operation. The output terminal of the OR gate 70a is connected to one input terminal of an OR gate 72 through an inventer 73. An output terminal of the NOR gate 70b is connected to another input terminal of the OR gate 72.

The output terminal of the above described OFF-delay time 71 is further connected to one input terminal of an AND gate 74. An output terminal of the OR gate 72 is connected to another input terminal of the AND gate 74. An output terminal of the AND gate 74 is connected to a negation input terminal of an AND gate 76 through an ON-delay timer 75. The output terminal of the OFF-delay timer 71 is connected to another input terminal of the AND gate 76. An output terminal of the AND gate 76 is connected to an amplifier 78. The amplified output R of the amplifier 78 is supplied to the solenoid portion 60a of the changeover valve 60 in FIG. 1. The ON-delay time $T_2$ of the ON-delay timer 75 is of the order of 0.5 second. When the above-described three-position electromagnetic changeover valve 4 has been mechanically locked at the B or C position for some reason, the time $T_2$ is long enough to provide an indication that the valve 4 has been locked.

When at least one of the signals AVVR, AVVL, AVHR and AVHL becomes "1", the output of the OR gate 70a becomes "1", so that the output of the OFF delay timer 71 becomes "1". Accordingly, the motor drive signal Q is generated. The output of the inverter 73, and therefore, the input to the one input terminal of the OR gate 72 becomes "0". When none of the brake holding signals EVVR, EVVL, EVHR and EVHL is generated, the output of the NOR gate 70b remains "1". As described hereinafter, if any of these signals becomes "1" before the delay time $T_2$ of the ON delay timer 75 lapses and the output of the ON delay time 75 does not become "1". Thus, the output of the AND gate 76 becomes "1" with the start of operation of the anti-skid control. As long as the three-position changeover valve 4 is working properly under the condition described above, the output of the AND gate 76 is maintained at the high level "1". Thus, the drive signal R continues to be generated, and it is supplied to the solenoid portion 60a of the changeover valve 60. The changeover valve 60 is changed to the position G, connecting the control chamber 40 to the conduit 6a and thus the wheel cylinders 7a and 10a. If any one of the signals AVVR, AVVL, AVHR and AVHL disappears, another of them will be generated within the delay time $T_1$ of the OFF delay timer 71, since it is sufficiently long. Thus, during the anti-skid control, the output AVZ of the OFF delay timer 71 is maintained at the high level "1". The output AVZ means the system is under anti-skid control. In other words, so long as the three-position electromagnetic changeover valve 4 operates properly, the changeover valve 60 takes the position G during anti-skid control. The control chamber 40 of the valve apparatus 12 is then always connected to the wheel cylinders 7a and 10a.

Next, consider the case when the three-position electromagnetic changeover valve 4 becomes inoperative, suppose, for example, it is mechanically locked at the position C. Before the anti-skid control is started, none of the signals AVVR, AVVL, AVHR and AVHL is generated in FIG. 6. Thus, the change-over valve 60 is maintained at the position F. The fluid pressures of the control chamber 40 and output chamber 41 in the valve apparatus 12 equally equally when the brake pedal 2 is depressed. The piston 32 remains stopped at the original position as shown in FIG. 2. The braking forces are applied to the wheels 8 and 9 of the other conduit system.

As described above, the changeover valve 60 takes the position G during anti-skid control. However, since the electromagnetic changeover valve 4 is mechanically locked at the position C, no braking force is applied to the wheels 7 and 10 of the one conduit system. Thus, the piston 32 remains at the leftward position in the valve apparatus 12. As a result, the braking force is not applied to the wheels 8 and 9 of the other conduit system. Neither the braking relieving signals AVVR, AVVL, AVHR or AVHL nor the brake holding signals EVVR, EVVL, EVHR, EVHL are generated from the wheels. In FIG. 6, when the delay time $T_2$ lapses without generation of the above signals, the output of the ON delay timer 75 becomes "1". Accordingly, the drive signal R becomes "0". The change-over valve 60 is forcibly changed over to the position F. Thus, the fluid pressure of the master cylinder is applied to the control chamber 40 to move the piston 32 to the left, and the valve ball 43 is opened. Accordingly, braking forces can be applied to the wheels and 9 of the other conduit system, preventing the loss of all braking.

The description above applies the circuit of FIG. 6 to the first embodiment of FIG. 1. The circuit of FIG. 6 may also be applied to the second and third embodiments of FIG. 4 and FIG. 5. In the embodiment of FIG. 5, when the two-position electromagnetic changeover valve 80 is mechanically locked at the position K for some reason, the changeover valve 60 is forcibly changed to the position F.

Figure 7:
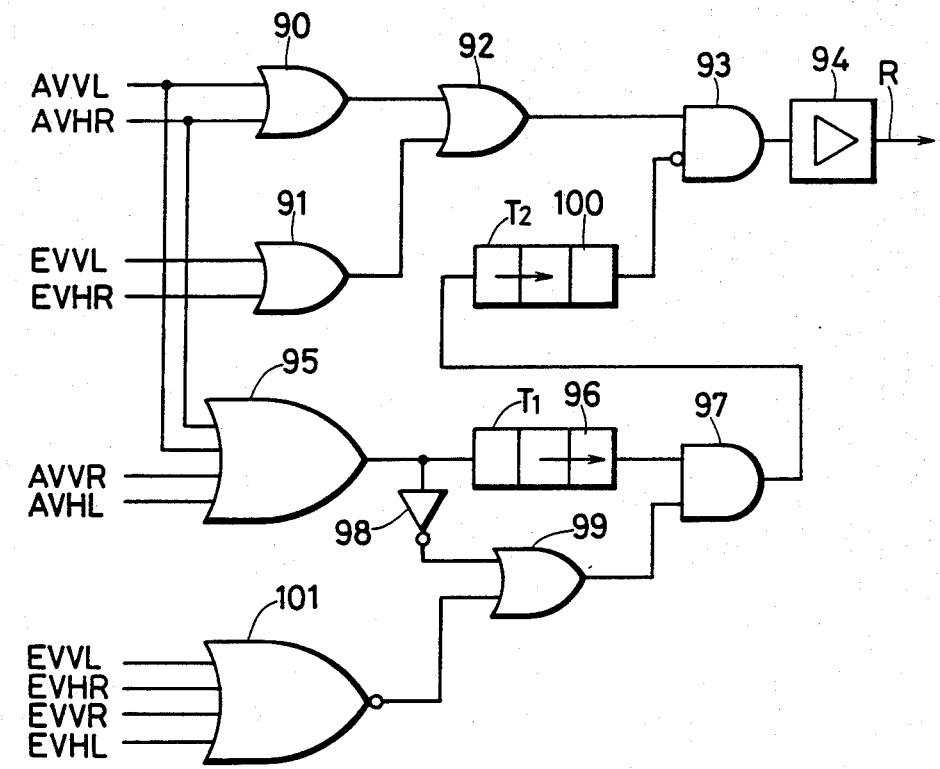
FIG. 7 is a circuit diagram of an important part of a control unit in an anti-skid control apparatus according to a fifth embodiment of this invention.

FIG. 7 is a circuit diagram of an important part of a control unit in an anti-skid control apparatus according to a fifth embodiment of this invention. The circuit of FIG. 7 is applied to a conduit system such as the conduit system shown in FIG. 1. In FIG. 7, the brake relieving signals AVVL and AVHR, and the brake holding signals EVVL and EVHR of the wheels 8 and 9 in the other conduit system are applied to OR gates 90 and 91. Output terminals of the OR gates 90 and 91 are connected to one input terminal of an AND gate 93 through an OR gate 92. The output of the AND gate 93 is amplified by an amplifier 94 to produce a changeover valve drive signal R.

In FIG. 7, other circuits detect valve lock in the fluid-pressure control. The brake relieving signals AVVL, AVHR, AVVR and AVHL are applied to an OR gate 95 and the brake holding signals EVVL, EVHR, EVVR and EVHL are applied to and a NOR gate 101. An output terminal of the OR gate 95 is connected to one input terminal of an AND gate 97 through an OFF-delay timer 96 The output terminal of the OR gate 95 is also connected to another input terminal of the AND gate 97 through an inverter gate 98 and an OR gate 99. An output terminal of the NOR gate 101 is connected to another input terminal of the OR gate 99.

An output terminal of the AND gate 97 is connected to a negation input terminal of the AND gate 93 through an ON-delay timer 100. The OFF-delay timer 96 and the ON-delay timer 100 correspond to the OFF-delay timer 71 and the ON-delay timer 75 in FIG. 6 respectively. Their OFF-delay times $T_1$ and $T_2$ are equal to the times $T_1$ and $T_2$ in FIG. 6, respectively.

According to this embodiment, when any one of the brake relieving signals AVVL and AVHR and brake holding signals EVVL and EVHR is not generated from the wheels 8 and 9 of the other conduit system, the drive signal R remains "0". Accordingly, the changeover valve 60 remains at the position F. The control chamber 40 of the valve apparatus 12 is connected to the master cylinder 1. Accordingly, the brake fluid pressure of the other conduit system can continue to rise irrespective of the control of the one conduit system. When a brake relieving signal or a brake holding signal is generated from the wheels 8 and 9, the drive signal R becomes "1" and the changeover valve 60 is changed to the position G. A control signal is then supplied to the three-position electromagnetic changeover valve 4. Thus, the brake fluid pressure of the other conduit system is also controlled through the valve apparatus 12. The other operations are the same as those of the fourth embodiment.

Figure 8:
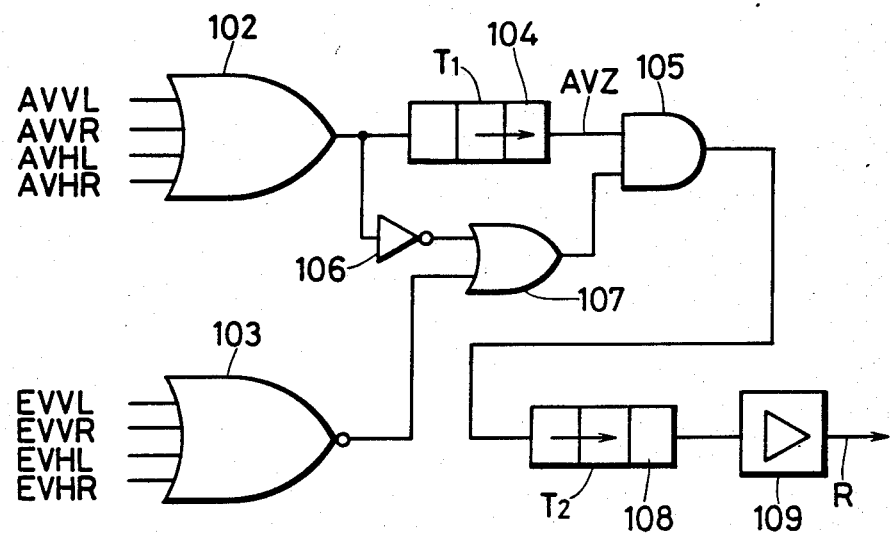
FIG. 8 is a circuit diagram of an important part of control unit in an anti-skid control apparatus according to sixth embodiment of this invention.
Figure 9:
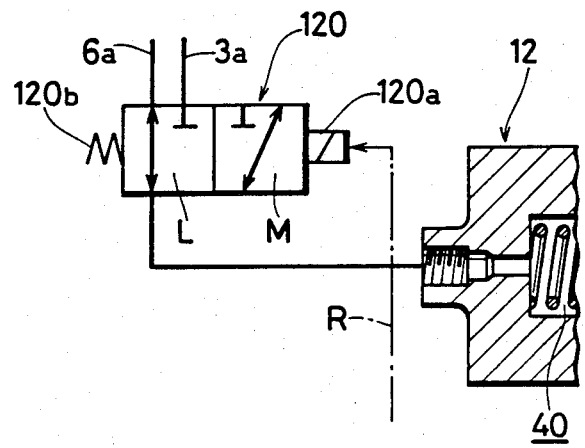
FIG. 9 is a schematic view of an important part of anti-skid control apparatus according to the sixth embodiment of this invention.

FIGS. 8 and 9 show a sixth embodiment of the invention. In FIGS. 8 and 9, a changeover valve 120 is used instead of the changeover valve 60 described above. The valve 120 is normally held in a position L by the spring force of a spring 120b. In this position, the valve 120 connects the conduit 6 to the control chamber 40. Parts in FIG. 9 which correspond to those in the above embodiments are denoted by the same reference numerals. Thus, the wheel cylinder side or output side of the fluid pressure control valve 4 can be connected to the control chamber of the valve apparatus. When a solenoid portion 120a is energized, the valve 20 takes another position M and connects the master cylinder to the control chamber 40.

In FIG. 8, the brake relieving signals AVVL, AVVR, AVHL and AVHR are applied to an OR gate 102 and the brake holding signals EVVL, EVVR, EVHL and EVHR are applied to a NOR gate 103. The output terminal of the OR gate 102 is connected to one input terminal of an AND gate 105 through the OFF-delay timer 104 and also to another input terminal of the AND gate 105 through an inverter 106 and an OR gate 107. The output terminal of the NOR gate 103 is connected to another input terminal of the OR gate 107. The output terminal of AND gate 105 is connected to an input terminal of an amplifier 109 through an ON-delay timer 108. The OFF-delay timer 104 and the ON-delay timer 108 corresponds to the OFF-delay timer 71 and the ON-delay timer 75 in FIG. 6, respectively. Their OFF-delay times $T_1$ and $T_2$ are the same as times $T_1$ and $T_2$ in FIG. 6.

According to this embodiment, unless the three-position electromagnetic changeover valve 4 is locked mechanically at the position B or C or the two-position electromagnetic valve 80 is mechanically locked at the position K, the drive signal R is "zero" and the changeover valve 200 remains in the position L. The control chamber 40 the valve apparatus 12 is connected to the wheel cylinder side. When the valve 4 is locked mechanically at the position B or C, or the valve 80 is locked mechanically at the position K, the drive signal R becomes "1". The solenoid portion 200a of the changeover valve 200 is energized, and the master cylinder side in the control chamber 40 are connected. The braking force to the wheels of the other conduit system can continue to increase regardless of the braking force in the one conduit system.

While the preferred embodiment has been described, variations thereto will occur to those skilled in the art within the scope of the present inventive concepts which are delineated by the following claims.

For example, three OR gates 70a, 70b and 71 are used in the changeover valve drive circuit shown in FIG. 3. Instead, one OR gate may be used. In that case, signals AVVL, AVHR and EVHR are supplied to the one OR gate and the signal EVVL may be used only for the cutoff valve 51b.

In the above embodiments, the X-type conduit system has been described. Instead, the H-type (front-rear separation type) conduit system may be applied to this invention.

Figure 5:
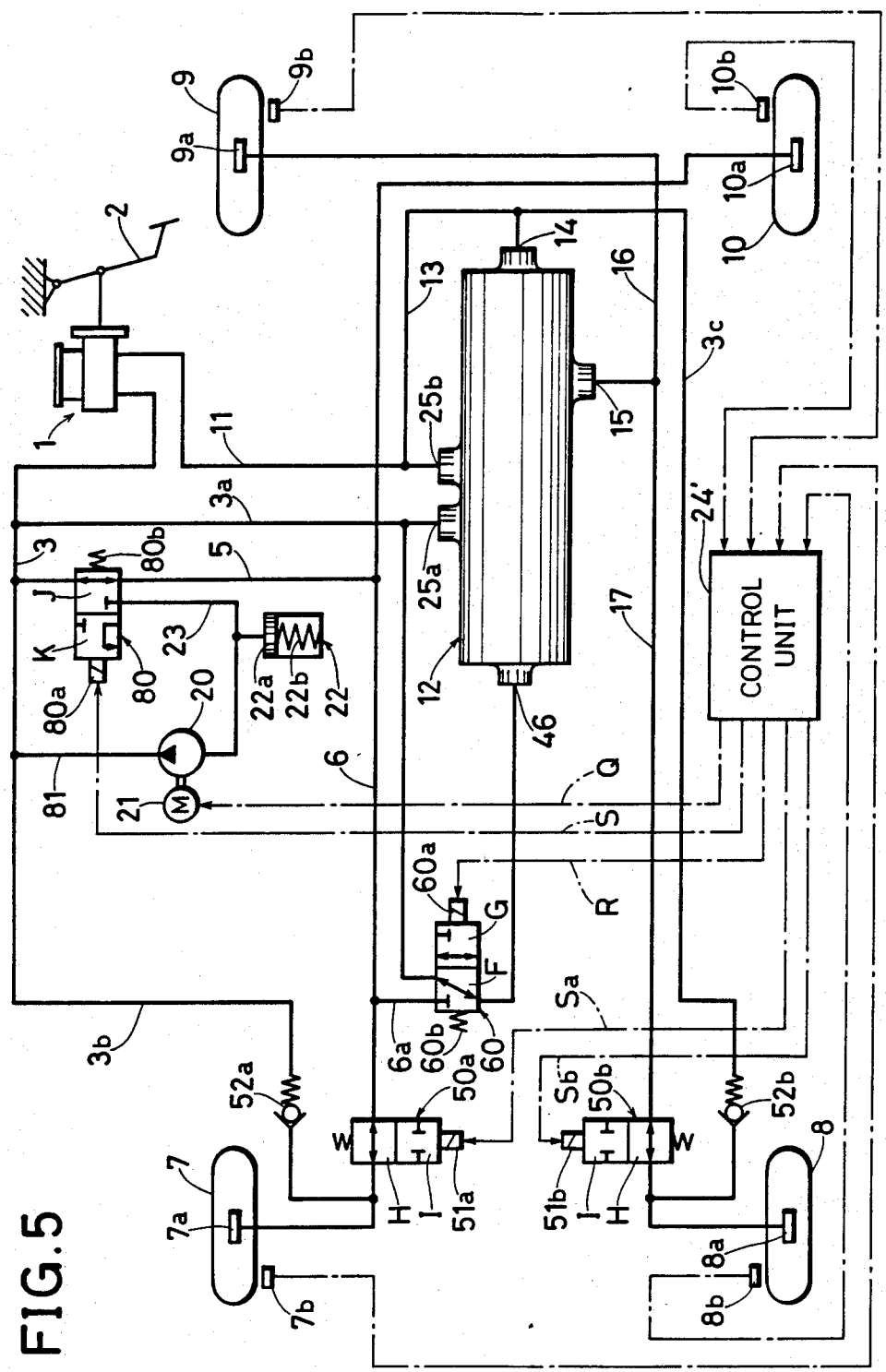
FIG. 5 is a schematic view of an anti-skid control apparatus according to a third embodiment of this invention.

In addition, in the embodiment of FIG. 5, the cut-off valves 50a, 50b, check valves 52a, 52b and conduits 3b, 3c may be omitted. A three-position electromagnetic changeover valve may be used instead of the two-position electromagnetic changeover valve 80 shown in FIG. 5. In that case, the braking forces to all the wheels can be maintained constant.

In the above embodiments, the piston 32 is one body in the valve apparatus 12. Instead, the larger-diameter portions 33a and 33b may be separated from the small-diameter diameter portion 34. Thus, the piston 32 may comprise two separate piston members. In that case, the original or neutral position of the piston members may be adjusted by the spring forces of springs arranged at both sides of the piston members.

In the above embodiments, the master cylinder pressure chambers 38 and 39 are arranged between the larger-diameter portions 33a 33a and 33b of the piston 32. With this arrangement, operation is assured if the one conduit system fails. Instead, another fail-safe arrangement may be used instead of the one shown.

Furthermore, in the embodiment of FIG. 6, the changeover valve 60 is forcibly changed to connect to the master cylinder side if any of the brake holding signals EVVR, EVVL, EVHR or EVHL is not generated for longer than a predetermined time. Instead, the changeover valve 60 may be changed over if only one of the brake relieving signals AVVR, AVVL, AVHR or AVHL is not generated for longer time than a predetermined.

In the circuit of FIGS. 6 and 7, the NOR gates 70b and 101 and the OR gates 72 and 99 that are connected to the output terminals of the NOR gates respectively may be omitted. Instead, the output terminals of the inverters 73 and 98 respectively may be connected directly to the input terminals of the AND gates 74 and 97 respectively. Thus, the mechanical lock of the fluid pressure changeover valve may be detected by the fact that no brake relieving signals are generated.

In addition, the above circuits, the delay time $T_2$ of the ON-delay timers 75 and 100 may be variable. For example, the frictional coefficient of the road on which the vehicle runs may be detected and the delay time $T_2$ may be set to be short on a low-$\mu$ road, while it is long on a high-$\mu$ road.

In the above circuits of FIGS. 6 and 7, the inputs to the inverters 73 and 98 are the outputs of the OR gates respectively to which the brake relieving signals AVVR, AVVL, AVHR and AVHL are supplied. Instead, the brake relieving signals AVVR and AVHL of the two wheels which are connected diagonally to each other may be supplied to the OR gate and the output of the OR gate may be used as the input to the inverter. In that case, only the signals EVVR and EVHL are supplied to the NOR gates 73 and 98 respectively. In the alternative, the input to the inverters 73, 98 and 106 may be the OR output of the brake relieving signals of both front wheels or of both rear wheels. The signals of the front and rear wheels on the same side or of only one wheel may be used as the input to the inverter.

In the embodiments, when the changeover valve 60 is forcibly returned to the normal position, anti-skid control may be temporarily lost. In this case, the system makes the operator aware of the loss.

In the above embodiment, the brake fluid is circulated from the valve 4 to reservoir 22, then to pump 20. Instead, a variable-volume anti-skid system may be used. Also, the system is shown as applied to a vehicle with four-wheels. Obviously, this invention may be applied to a two-wheeled vehicle.

In addition, the above embodiments, mechanical lock of the fluid pressure control valve is detected by the signals representing the skid conditions of the wheels. Such a lock may be detected by other means. For example, the change of the discharge pressure of the fluid pressure pump 20 may be measured to detect mechanical lock of the fluid pressure valve or mechanical lock of the fluid pressure control valve may be directly detected by any other mechanical means.

What is claimed is:

1. In an anti-skid control apparatus for a vehicle braking system comprising:
   (A) a fluid pressure generating source to which two brake conduit circuits are connected;
   (B) a fluid pressure valve whose output side is connected to a wheel cylinder that is connected to one of said two brake conduit circuits to control fluid pressure of the wheel cylinder;
   (C) a valve apparatus for controlling fluid pressures of a wheel cylinder connected to the other of said two brake conduit circuits, said valve apparatus comprising a casing having first and second input ports and an output port, a piston, a control chamber and a volume chamber formed at both sides of said piston, a valve part arranged between said first input port and said volume chamber, and a pre-loading means which always presses in a direction to open said valve part, said first input port being connected to one fluid pressure generating chamber of said fluid pressure generating source, said second input port being connected to said control chamber, and said output port being connected to said volume chamber and to said wheel cylinder connected to the other of said two brake conduit circuits; the improvements in which changeover valve means is connected to said
   second input port of the casing of the valve apparatus, said changeover valve means taking a first position in which said control chamber connects with another fluid pressure generating chamber of said fluid pressure generating source and is cut off from said wheel cylinder connected to one of said two brake conduit circuits, and taking a second position in which said control chamber is connected to said wheel cylinder that is connected to one of said two brake conduit circuits and is cut off from another fluid pressure generating chamber of said fluid pressure generating source when a skid signal to release the brake or to maintain the braking force constant is generated from said wheel cylinder connected to the other of the two brake conduit circuits wherein, when said changeover valve means takes said first position, said valve part is open due to said pre-loading means, and when said changeover valve means takes said second position and said fluid pressure control valve is operated, said piston is moved toward said control chamber by the difference in pressure between said control chamber and said volume chamber to close said valve part to cut off said first input port from said volume chamber and change the volume of said volume chamber with the movement of said piston.

2. An anti-skid control apparatus according to claim 1, in which said changeover valve means is normally in said first position, and when a skid signal to relieve the brake is generated from a wheel connected to the other of the two brake conduit circuits, said changeover valve means takes said second position.

3. An anti-skid control apparatus according to claim 1 in which said changeover valve means normally takes said first position when anti-skid control operation is not effected, or a skid signal to relieve the brake or maintain the brake constant is generated only from the wheel connected to said one of the two brake conduit circuits, and said changeover valve means takes said second position with a skid signal to relieve the brake or maintain the brake constant is generated from the wheel connected to the other of the two brake conduit circuits, wherein said changeover valve means is forcibly changed over to said first position when it is detected that said fluid pressure control valve has been locked at the position for relieving the brake or maintaining the brake constant.

4. An anti-skid control apparatus according to claim 3, in which the lock of the fluid pressure control valve to said position is detected by the fact that a skid signal to relieve the brake or maintain the brake at constant has not been generated for a longer time than a predetermined time from any one of said wheels.

5. An anti-skid control apparatus according to claim 1, in which said changeover valve means takes normally said second position, and it is changed over to said first position, when it is detected that said fluid pressure control valve has been locked at the position for relieving the brake or maintaining the brake at constant.

6. An anti-skid control apparatus according to claim 5, in which the lock of the fluid pressure control valve to said position is detected by the fact that a skid signal to relieve the brake or maintain the brake at constant has not been generated for a longer time than a predetermined time from any one of said wheels.

7. An apparatus according to claim 4 or 6, in which said predetermined time is variable.

8. An anti-skid control apparatus according to claim 1 in which said apparatus further comprises means for circulating brake fluid discharged from said wheel cylinder connected to said one of the two conduit circuits in the brake relieving position of the fluid pressure control valve through a path consisting of a first conduit connecting an output means of a fluid pressure pump means directly with said wheel cylinder connected to one of said two brake conduit circuits, a second circuit connecting the wheel cylinder connected to one of said two brake conduit circuits with said fluid pressure control valve and a third conduit connecting said fluid pressure control valve through a hydraulic reservoir means with the inlet means of said fluid pressure pump means.

9. An anti-skid control apparatus according to claim 8, in which said circulating means includes a controllable check valve arranged in said first conduit connecting the outlet means of said fluid pressure pump means directly with said wheel cylinder, and said hydraulic reservoir means includes a reservoir chamber and a piston, and said anti-skid apparatus further comprises a check valve connected in a conduit connecting said fluid pressure generating source and said outlet of the fluid pressure pump means, said check valve permitting fluid to flow only in the direction from said outlet of the fluid pressure pump means toward said fluid pressure generating source, said controllable check valve allowing said fluid pressure pump means and said wheel cylinder to freely communicate with each other, and functioning as a check valve to permit fluid to flow only in the direction from said wheel cylinder toward the outlet of said fluid pressure pump means when said piston is moved more than a predetermined distance in said hydraulic reservoir means or when fluid pressure becomes higher than a predetermined value in a reservoir chamber of said hydraulic reservoir means.

10. An apparatus according to claim 1 in which two wheels are diagonally connected to said one and other of the two brake conduit circuits, respectively, and cutoff valves are connected between the respective two wheels.

* * * * *